United States Patent [19]
Ishibuchi et al.

[11] Patent Number: 6,117,261
[45] Date of Patent: Sep. 12, 2000

[54] SHEET TENSION ADJUSTING METHOD AND APPARATUS

[75] Inventors: Hiroshi Ishibuchi; Kazukiyo Kohno; Yukuharu Seki; Makoto Ando, all of Hiroshima-ken, Japan

[73] Assignee: Mitsubishi Heavy Industries, Ltd., Tokyo, Japan

[21] Appl. No.: 09/072,358

[22] Filed: May 5, 1998

[30] Foreign Application Priority Data

May 7, 1997 [JP] Japan ..................... 9-116827

[51] Int. Cl.$^7$ ............... B31F 1/22; B32B 31/00
[52] U.S. Cl. ................... 156/184; 156/64; 156/205; 156/210; 156/361; 156/470; 156/494
[58] Field of Search ................ 156/205, 210, 156/462, 468, 184, 361, 470, 471, 494, 495, 496, 64; 242/419, 410

[56] References Cited

U.S. PATENT DOCUMENTS

| | | | |
|---|---|---|---|
| 3,966,137 | 6/1976 | Schuessler | 242/422.1 |
| 4,209,563 | 6/1980 | Sisson | 156/167 |
| 4,373,712 | 2/1983 | Mitzel | 271/272 |
| 4,498,949 | 2/1985 | Soennichsen | 156/205 X |
| 4,748,066 | 5/1988 | Kelly et al. | 156/210 X |
| 4,929,297 | 5/1990 | Sato | 156/361 |
| 5,223,069 | 6/1993 | Tokuno et al. | 156/361 X |
| 5,437,752 | 8/1995 | Lang | 156/210 |
| 5,728,256 | 3/1998 | Schulz et al. | 156/205 X |
| 5,735,986 | 4/1998 | Fell | 156/210 X |

FOREIGN PATENT DOCUMENTS

| | | |
|---|---|---|
| 0464616 | 1/1992 | European Pat. Off. . |
| 0825016 | 2/1998 | European Pat. Off. . |
| 1402137 | 10/1965 | France . |
| 2234771 | 1/1975 | France . |
| 1499074 | 11/1969 | Germany . |
| 2548097 | 5/1977 | Germany . |
| 63-5861 | 2/1988 | Japan . |
| 1-316257 | 12/1989 | Japan . |
| 8-85654 | 4/1996 | Japan . |
| 9-29870 | 2/1997 | Japan . |
| 2211216 | 6/1989 | United Kingdom . |

*Primary Examiner*—Richard Crispino
*Assistant Examiner*—Sue A. Purvis
*Attorney, Agent, or Firm*—Armstrong, Westerman, Hattori, McLeland & Naughton

[57] ABSTRACT

The present invention relates to a sheet tension adjusting method which allows the tension to a single-faced corrugated fiberboard sheet or a liner to be greatly adjusted with a high accuracy to be capable of the adjustment of upward or downward warps of the corrugated fiberboard sheet. In the method according to this invention, when manufacturing a single-faced corrugated fiberboard sheet $S_1$ in a manner that a liner $L_1$ is adhered onto a corrugated sheet $C_1$, the single-faced corrugated fiberboard sheet $S_1$ is wound around one or more rolls 1 to change a braking force to the roll 1, thereby adjusting the tension to the single-faced fiberboard sheet $S_1$. Further, this invention is effectively applicable in manufacturing various kinds of corrugated fiberboard sheets.

8 Claims, 8 Drawing Sheets

$$T_3 = T_{03} \times e^{\mu_3 \theta_3}$$

SHEET TENSION ADJUSTING METHOD AND APPARATUS

BACKGROUND OF THE INVENTION

1) Field of the Invention

The present invention relates to a sheet tension adjusting method and apparatus for, when guiding and conveying a single-faced corrugated fiberboard sheet or a liner through a roll for manufacturing a single-faced corrugated fiberboard in a manner of applying a paste onto peak portions of a corrugated sheet to adhere the liner thereto, adjusting the tension to be given to the single-faced corrugated fiberboard sheet or the liner.

2) Description of the Related Art

Figure 8:
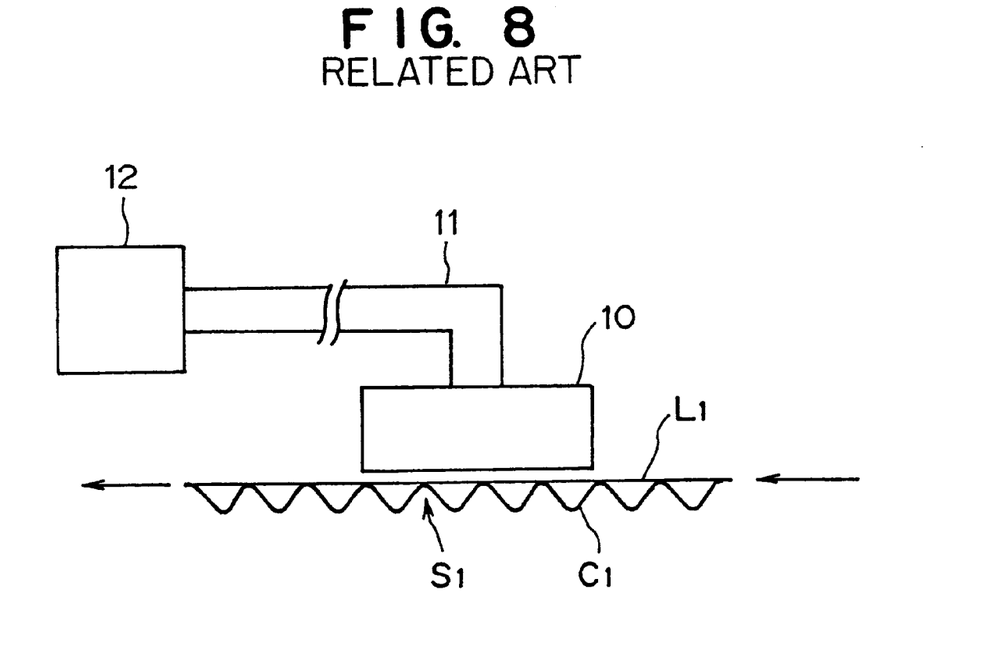
FIG. 8 is an illustration for explaining a prior sheet tension adjusting means (a tension adjusting condition for a single-faced corrugated fiberboard sheet)
Figure 9:
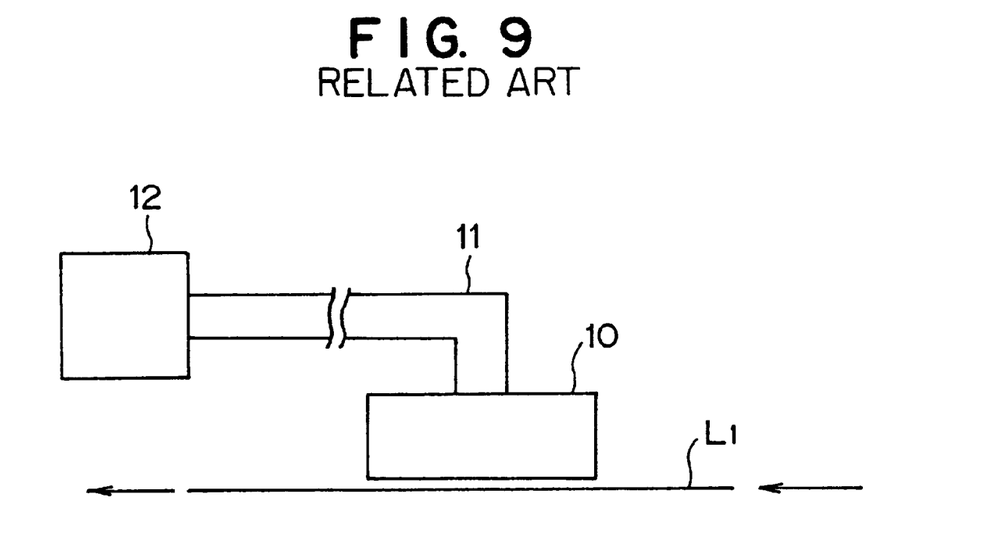
FIG. 9 is an illustration for describing a prior sheet tension adjusting means (a tension adjusting condition for a liner).

FIGS. 8 and 9 are illustrations each useful for describing a prior sheet tension adjusting means. FIG. 8 shows an arrangement for performing a tension adjustment for a single-faced corrugated fiberboard sheet $S_1$ produced in a manner that a paste is applied onto the peak portions of a corrugated core paper (sheet) $C_1$ and a liner $L_1$ is adhered thereonto, while FIG. 9 illustrates an arrangement for conducting a tension adjustment for a liner $L_1$ while conveying the liner $L_1$ for manufacturing a single-faced corrugated fiberboard sheet $S_1$.

In both the cases shown in FIGS. 8 and 9, a suction box 10 is placed in the vicinity of the single-faced corrugated fiberboard sheet $S_1$ or the liner $L_1$, and is communicated through a suction hose 11 to a suction pump 12 so that the air within the suction box 10 is sucked through the suction hose 11 when the suction pump 12 is put into operation.

With the above-mentioned constructions, for the tension adjustment of the single-faced corrugated fiberboard sheet $S_1$, when the single-faced corrugated fiberboard sheet $S_1$ comprising the corrugated core paper $C_1$ and the liner $L_1$ on conveyance passes in the vicinity of the suction box 10 as shown in FIG. 8, the single-faced corrugated fiberboard sheet $S_1$ undergoes the suction from the liner $L_1$ side by the suction box 10 to meet with a resistance, thereby changing and adjusting the tension to the single-faced corrugated fiberboard sheet $S_1$.

Likewise, in the case of conducting the tension adjustment for the liner $L_1$, when the liner $L_1$ on conveyance passes in the vicinity of the suction box 10 as shown in FIG. 9, the suction box 10 sucks the liner $L_1$ to make a resistance thereto, thus accomplishing the change and adjustment of the tension to the liner $L_1$.

However, since these prior sheet tension adjusting means have a limitation in suction capacity of the suction box 10, the tension to the single-faced corrugated fiberboard sheet $S_1$ or the liner $L_1$ is changeable by only approximately 0.1 kgf/cm, and the expansion and contraction variation of the single-faced corrugated fiberboard sheet $S_1$ or the liner $L_1$ is as extremely small as approximately 0.01%. In addition, since the tension adjustment relies upon the frictional resistance force, i.e., depends upon the suction box 10 or the sheet surface conditions, the tension adjustment accuracy deteriorates.

For this reason, difficulty is encountered to adjust the upward warp or downward warp, thus impairing the quality of the corrugated fiberboard.

SUMMARY OF THE INVENTION

Accordingly, the present invention has been developed with a view to eliminating this problem, and it is therefore an object of this invention to provide a sheet tension adjusting method and apparatus which are capable of greatly the tension to a single-faced corrugated fiberboard sheet or a liner with a high accuracy to allow the adjustment of the upward or downward warps of the corrugated fiberboard sheet to improve the quality of the corrugated fiberboard sheet.

For this purpose, in a sheet tension adjusting method according to the present invention, when a liner is adhered onto a corrugated sheet to manufacture a single-faced corrugated fiberboard sheet, the single-faced corrugated fiberboard sheet is wound around one or more rolls so that a braking force to the rolls is changed to adjust the tension to the single-faced corrugated fiberboard sheet.

Furthermore, in a sheet tension adjusting method according to the present invention, when a liner is adhered onto a corrugated sheet to manufacture a single-faced corrugated fiberboard sheet, the liner is wound around one or more rolls so that a braking force to the rolls is changed to adjust the tension to the liner.

In this case, it is also appropriate that the outer circumferential surfaces of the rolls are processed to increase its coefficient of friction, and that the single-faced corrugated fiberboard sheet or the liner is guided by guide rolls at positions before and after the winding around the rolls to adjust the contact angle (winding angle) of the single-faced corrugated fiberboard sheet or the liner with respect to the rolls.

On the other hand, a sheet tension adjusting apparatus according to this invention is for the purpose of adjusting the tension to a single-faced corrugated fiberboard sheet when manufacturing the single-faced corrugated fiberboard sheet in a manner of adhering a liner to a corrugated sheet, and is composed of one or more rolls around which the single-faced corrugated fiberboard sheet is wound and a braking unit for changing a braking force to the rolls.

Furthermore, a sheet tension adjusting apparatus according to this invention is for the purpose of adjusting the tension to a liner when manufacturing a single-faced corrugated fiberboard sheet in a manner of adhering the liner to a corrugated sheet, and is composed of one or more rolls around which the liner is wound and a braking unit for changing a braking force to the rolls.

In this case, it is also appropriate that the outer circumferential surfaces of the rolls are processed to increase its coefficient of friction, and that guide rolls are further provided to guide the single-faced corrugated fiberboard sheet or the liner before and after the winding around the rolls to adjust the contact angle of the single-faced corrugated fiberboard sheet or the liner with respect to the rolls.

Thus, the sheet tension adjusting method and apparatus according to this invention have an extremely simple structure in which a single-faced corrugated fiberboard sheet or a liner is wound around one or more rolls to change the braking force to the rolls, and hence, are capable of increasing the maximum tension immediately before the single-faced corrugated fiberboard sheet or the liner slides on the rolls on the final roll exit side, so that the brake torque variation up to the maximum tension is possible to appropriately accomplish the variation of the tension to the single-faced corrugated fiberboard sheet or the liner.

Accordingly, since it is possible to easily increase the roll exit side maximum tension and to greatly adjust the tension to the single-faced corrugated fiberboard sheet or the liner with a high accuracy, the adjustment of the upward or downward warp of the single-faced corrugated fiberboard sheet or the liner is feasible, thus considerably enhancing the quality of a corrugated fiberboard manufactured.

Incidentally, in a manner that the outer circumferential surface of the rolls is processed in order to increase the coefficient of friction or the contact angle of the single-faced corrugated fiberboard sheet or the liner around the rolls is adjusted by the guide roll, the roll exit side maximum tension to the single-faced corrugated fiberboard sheet or the liner can easily increase so that the tension to the single-faced corrugated fiberboard sheet or the liner is adjustable over a wider range.

DESCRIPTION OF THE PREFERRED EMBODIMENTS

Embodiments of the present invention will be described hereinbelow with reference to the drawings.

[A] Description of First Embodiment

Figure 1:
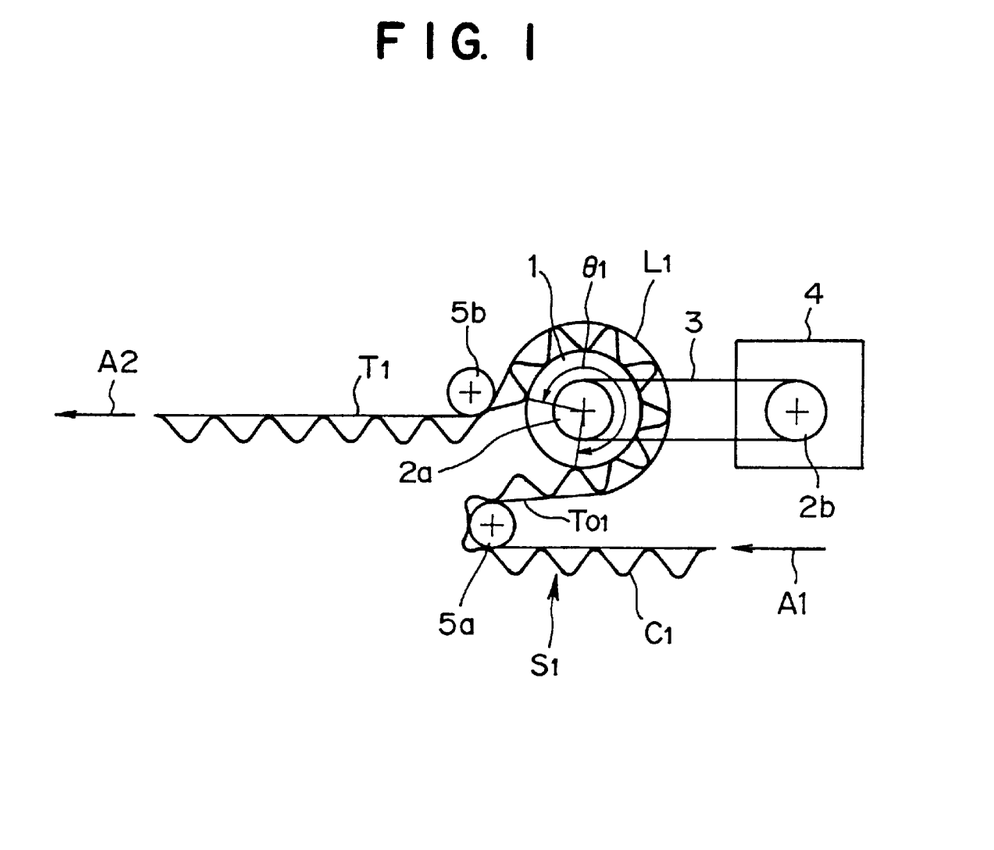
FIG. 1 is a side elevational view illustratively showing an apparatus (sheet tension adjusting apparatus) based upon a sheet tension adjusting method according to a first embodiment of the present invention.

As shown in FIG. 1, in a sheet tension adjusting apparatus according to a first embodiment, at conveyance, a single-faced corrugated fiberboard sheet $S_1$ manufactured in a manner of applying a paste onto the peak portions of a corrugated core paper (sheet) $C_1$ and adhering a liner $L_1$ thereto is wound around a first powder brake guide roll 1 in a state where the crest side of the core paper $C_1$ is positioned inside (the outer circumferential surface side of the roll 1), thereby adjusting the tension to the single-faced corrugated fiberboard sheet $S_1$.

A surface processing such as a surface-treatment comprising mesh-processing and chrome-plating or thermal spraying is made on an outer circumferential surface of the guide roll 1 to increase the coefficient of friction of the roll surface.

Furthermore, before and after the guide roll 1 (at positions before and after the points where the single-faced corrugated fiberboard sheet $S_1$ is wound around the guide roll 1), guide rolls 5a, 5b are respectively disposed to guide the single-faced corrugated fiberboard sheet $S_1$, and in a manner of adjusting the positions of these guide rolls 5a, 5b, the contact angle (winding angle) $\theta_1$ of the single-faced corrugated fiberboard sheet $S_1$ to the guide roll 1 is adjustable and maintainable.

Still further, in this embodiment, a first powder braking unit 4 is provided to change the braking force working on the guide roll 1. That is, a transmission belt 3 is windingly stretched between a rotary shaft 2a of the guide roll 1 and a rotary shaft 2b of the first powder braking unit 4 so that the tension to the single-faced corrugated fiberboard sheet $S_1$ is changeable in a manner that the torque change (braking force change) of the first powder brake guide roll 1 is made by the first powder braking unit 4 through the transmission belt 3.

Figure 2A:
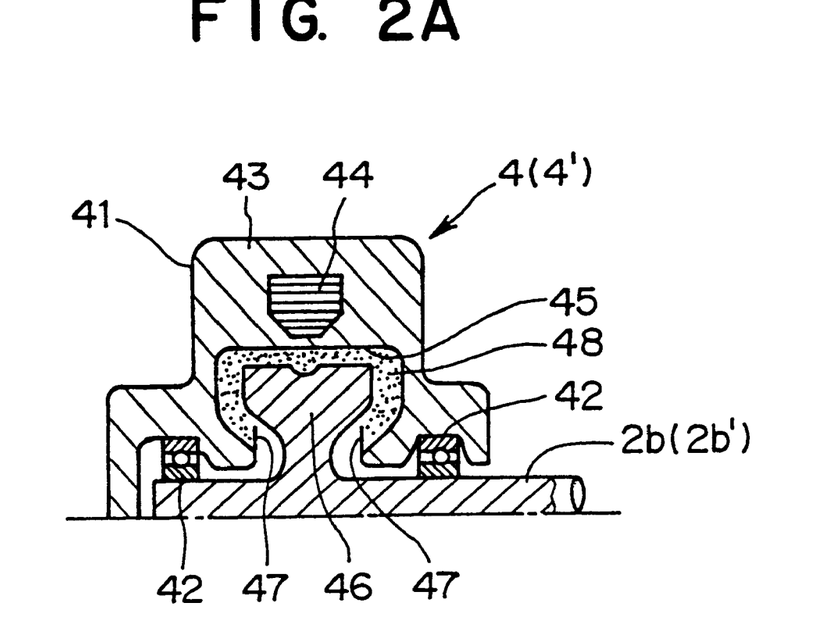
FIGS. 2A and 2B are cross-sectional views each illustratively showing a powder braking unit for explaining a structure and operation of the powder braking unit to be used in this embodiment.
Figure 2B:
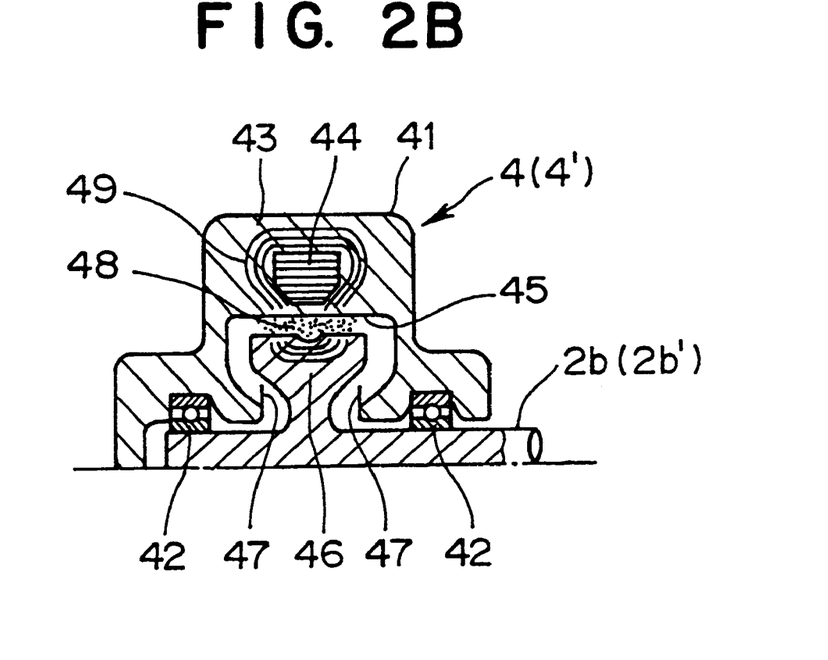
Figure 3:
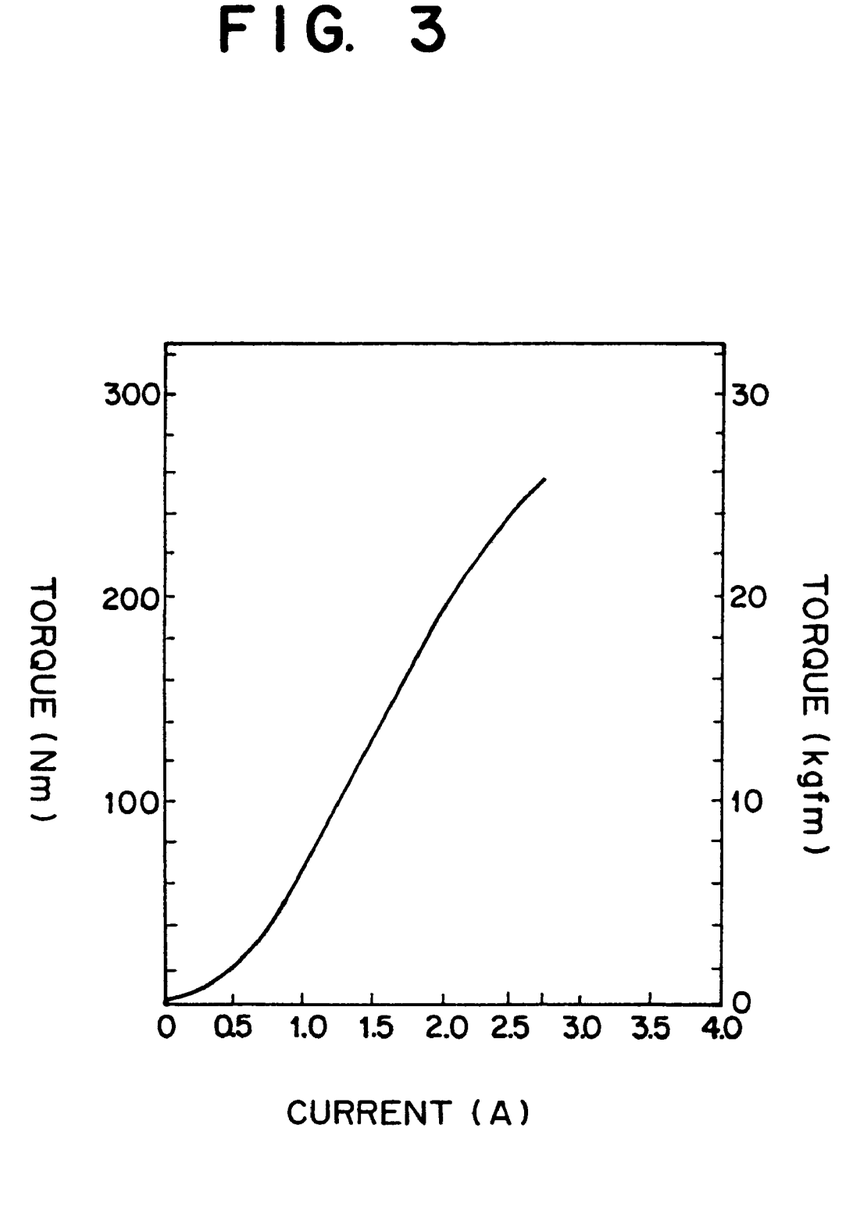
FIG. 3 is a graphic illustration of an operating characteristic (torque-to-current characteristic) of a powder braking unit to be used in this embodiment.

Referring now to FIGS. 2A, 2B and 3, a description will be taken hereinbelow of a construction and operation of the first powder braking unit 4 (a second powder braking unit 4' which will be described herein later). FIGS. 2A and 2B are cross-sectional views each illustratively showing the powder braking unit 4 for describing the construction and operation of the powder braking unit 4, and FIG. 3 is a graphic illustration of an operating characteristic (torque-current characteristic) of the powder braking unit 4. The first powder braking unit 4 used in first to fourth embodiments has the same structure as a second powder braking unit 4' employed in third and fourth embodiments, and as well as a mechanical brake, is designed to convert a kinetic energy into a thermal energy due to friction to produce a braking force.

As shown in FIGS. 2A and 2B, the rotary shaft 2b is pivotally born through a bearing 42 with respect to a housing 41 of the powder braking unit 4, and inside the housing 41, a rotor 46 formed to protrude from an outer circumference of the rotary shaft 2b is stored to be rotatable in a state where a gap 45 is defined between the rotor 46 and the housing 41.

In addition, provided in the housing 41 is a stator 43 surrounding an outer circumference of the rotor 46 in a state where the gap 45 exists therebetween. This stator 43 is constructed as an electromagnet containing an exciting coil 44, and a magnetic substance powder 48 is placed in the gap 45 between the stator 43 and the rotor 46. As the powder 48 there is employed a powder of iron, aluminium and chrome having particle diameters of approximately several $\mu$m. Further, sealing members 47, 47 for preventing the leakage of the powder 48 to the external are set at both end portions of the gap 45 within the housing 41.

In the case of this powder braking unit 4 (4'), as shown in FIG. 2A, in a state that a current does not flow into the exciting coil 44, since the powder 48 exists in a dispersed condition within the gap 45, no bonding power occurs between the stator 43 and the rotor 46, with the result that no braking force for the rotary shaft 2b (2b'), i.e., the guide roll 1 (1') takes place.

On the other hand, as shown in FIG. 2B, in a state where the current flows in the exciting coil 44, a magnetic flux 49 developed advances through a magnetic circuit extending from the stator 43 to the rotor 46, and the powder 48 magnetized by the magnetic flux 49 is solidified in a state of being coupled in a chain-like configuration along the magnetic circuit, which produces the bonding power between the stator 43 and the rotor 46 so that the bonding power functions as a braking force (braking torque) to the rotary shaft 2b (2b'), i.e., the guide roll 1 (1').

The change of the braking torque depends upon the change of the exciting current flowing in the exciting coil 44. For instance, the relationship between the braking torque and the exciting current is as shown in FIG. 3. In FIG. 3, the braking torque substantially varies linearly in proportion to the exciting current, so that an excellent controllability is obtainable, and further, the response time is short because of depending upon only the solidification time (engaging time) of the powder 48 due to the magnetic force, and no impact occurs at the engagement. Therefore, the powder braking unit 4 (4') displays a characteristic superior to that of the mechanical brake.

Since the sheet tension adjusting apparatus according to the first embodiment of this invention is constructed as described above, the single-faced corrugated fiberboard sheet $S_1$ is wound around the first powder brake guide roll 1 at a given contact angle $\theta_1$ owing to the effects of the guide rolls 5a, 5b and is conveyed in directions of arrows A1, A2 in FIG. 1.

At this time, the first powder braking unit 4 makes a change in the torque of the first powder brake guide roll 1 (changes the braking force) through the rotary shaft 2b, the transmission belt 3 and the rotary shaft 2a to make a change in the tension to the single-faced corrugated fiberboard sheet $S_1$, thereby adjusting the degree of expansion and contraction of the single-faced corrugated fiberboard sheet $S_1$.

That is, under the condition that the single-faced corrugated fiberboard sheet $S_1$ does not slide on the guide roll 1, if the torque of the guide roll 1 is made to increase, the resistance force of the single-faced corrugated fiberboard sheet $S_1$ rotating together with the guide roll 1 increases and the sheet tension on the roll exit side increases to expand the single-faced corrugated fiberboard sheet $S_1$. On the contrary, if the torque of the guide roll 1 decreases, the resistance force of the single-faced corrugated fiberboard sheet $S_1$ rotating together with the guide roll 1 becomes stronger and the sheet tension on the roll exit side reduces to contract the single-faced corrugated fiberboard sheet $S_1$.

With such a change of the torque of the guide roll 1, the sheet tension on the roll exit side varies, while the sheet tension is limited to a value (maximum value) and, in the range not exceeding the maximum value, the torque change of the guide roll 1 can cause the change of the roll exit side tension. However, if exceeding the maximum value, the single-faced corrugated fiberboard sheet $S_1$ slips on the guide roll 1 so that difficulty is experienced to change the roll exit side tension.

For this reason, there is a need to raise the maximum value of the roll exit side sheet tension up to as a larger value as possible without making the single-faced corrugated fiberboard sheet $S_1$ slip on the guide roll 1.

The maximum roll exit side tension $T_1$ immediately before the single-faced corrugated fiberboard sheet $S_1$ slips on the first powder brake guide roll 1 is generally expressed as the following equation (1).

$$T_1 = T_{01} \times \exp(\mu_1 \theta_1) \tag{1}$$

In this equation (1), exp $(x) = e^x$ (e: the base of the natural logarithm), $T_{01}$ represents a tension to the single-faced corrugated fiberboard sheet $S_1$ on the entrance side of the guide roll 1, $\mu_1$ denotes a coefficient of friction of the surface of the guide roll 1, and $\mu_1$ depicts a contact angle of the single-faced corrugated fiberboard sheet $S_1$ with respect to the guide roll 1.

From the above-mentioned equation (1), it is found that the increase in the maximum roll exit side tension $T_1$ is achievable by the increase in any one of the roll 1 entrance side tension $T_{01}$, the coefficient of friction $\mu_1$ of the roll 1 surface and the contact angle $\theta_1$ to the guide roll 1. In this embodiment, the outer circumferential surface of the guide roll 1 is processed in order to increase the coefficient of friction, or the contact angle $\theta_1$ of the single-faced corrugated fiberboard sheet $S_1$ to the guide roll 1 is adjusted in a manner that the single-faced corrugated fiberboard sheet $S_1$ is guided by the guide rolls 5a, 5b at the portions before and after the winding around the guide roll 1, thereby increasing the maximum roll exit side tension $T_1$.

As described above, according to the first embodiment of this invention, it is possible to easily increase the maximum roll exit side tension $T_1$ and further to greatly adjust the tension to the single-faced corrugated fiberboard sheet $S_1$ with a high accuracy, with the result that the upward and downward warps of the single-faced corrugated fiberboard sheet $S_1$ are adjustable to sharply enhance the quality of a corrugated fiberboard to be manufactured.

Although it is also appropriate that the single-faced corrugated fiberboard sheet $S_1$ is wound around the guide roll 1 in a state where the liner $L_1$ is placed inside, if the single-faced corrugated fiberboard sheet $S_1$ is wound around the guide roll 1 in a state where the crest side (the core paper $C_1$ side) takes the inside as mentioned in the first embodiment described above, since the coefficient of friction further increases, it has actually been confirmed that a greater tension is securable. Further, a confirmation has actually been made of the fact that, even if the single-faced corrugated fiberboard sheet $S_1$ is wound around the guide roll 1 in a state where the core paper $C_1$ is located inside to produce a sheet tension of approximately 3 kgf/cm, the crests formed on the core paper $C_1$ are not broken.

[B] Description of Second Embodiment

Figure 4:
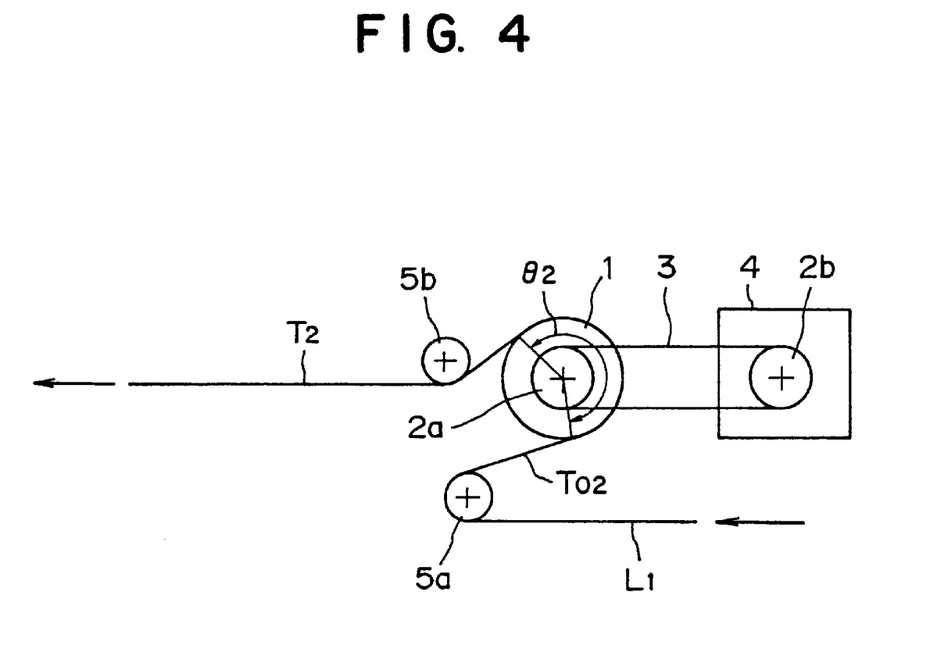
FIG. 4 is a side elevational view illustratively showing an apparatus (sheet tension adjusting apparatus) based upon a sheet tension adjusting method according to a second embodiment of the present invention.

In a sheet tension adjusting apparatus according to a second embodiment, as shown in FIG. 4, in place of the single-faced corrugated fiberboard sheet $C_1$ in the first embodiment, the liner $L_1$ before adhering the core paper $C_1$ is wound around the first powder brake guide roll 1 and conveyed, thereby adjusting the tension to the liner $L_1$. Incidentally, in the illustration, the same numerals as those used above signify the same or corresponding parts, and the description thereof will be omitted for brevity.

As shown in FIG. 4, also in the second embodiment, as well as the first embodiment, the change of the torque of the first powder brake guide roll 1 is made by the first powder braking unit 4 through the transmission belt 3 so that it is possible to change the tension to the liner $L_1$.

The maximum roll exit side tension $T_2$ immediately before the liner $L_1$ slips on the first powder brake guide roll 1 is generally expressed by the following equation (2).

$$T_2 = T_{02} \times \exp(\mu_2 \theta_2) \tag{2}$$

In this equation (2), exp $(x) = e^x$ (e: the base of the natural logarithm), $T_{02}$ represents a tension to the liner $L_1$ on the entrance side of the guide roll 1, $\mu_2$ denotes a coefficient of friction of the surface of the guide roll 1, and $\theta_2$ depicts a contact angle of the liner $L_1$ with respect to the guide roll 1.

Accordingly, from the above-mentioned equation (2), it is found that the increase in the maximum roll exit side tension $T_2$ is achievable by the increase in any one of the roll 1 entrance side tension $T_{02}$, the coefficient of friction $\mu_2$ of the roll 1 surface and the contact angle $\theta_2$ to the guide roll 1. Likewise, in this embodiment, the outer circumferential surface of the guide roll 1 is processed in order to increase the coefficient of friction, or the contact angle $\theta_2$ of the liner $L_1$ to the guide roll 1 is adjusted in a manner that the liner $L_1$ is guided by the guide rolls 5a, 5b at the portions before and after the winding around the guide roll 1, thereby increasing the maximum roll exit side tension $T_2$.

As described above, according to the second embodiment of this invention, it is possible to easily increase the maximum roll exit side tension $T_2$ to the liner $L_1$ and further to greatly adjust the tension of the liner $L_1$ with a high accuracy, with the result that the upward and downward warps of the liner $L_1$ are adjustable to sharply enhance the quality of a corrugated fiberboard to be manufactured.

[C] Description of Third Embodiment

Figure 5:
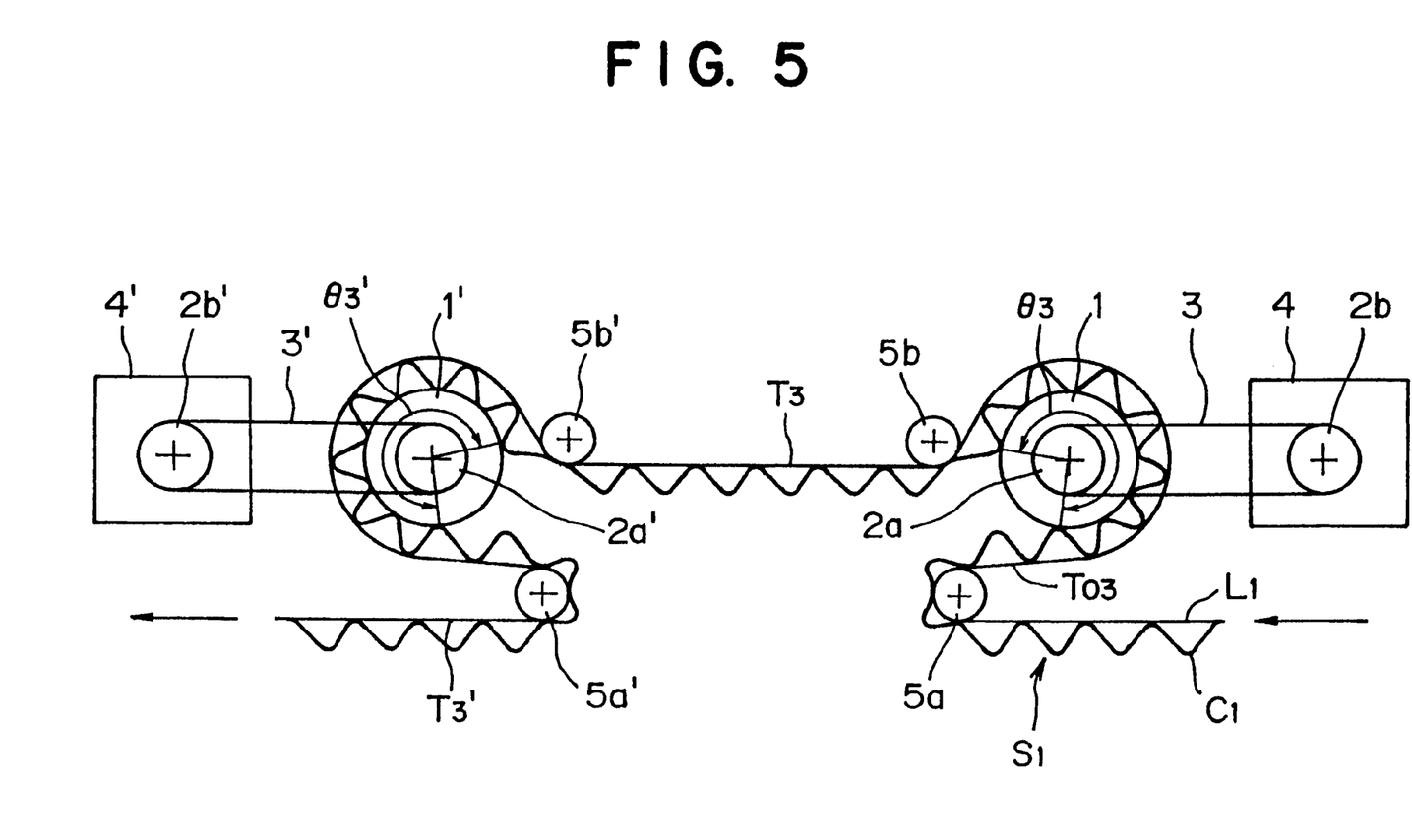
FIG. 5 is a side elevational view illustratively showing an apparatus (sheet tension adjusting apparatus) based upon a sheet tension adjusting method according to a third embodiment of the present invention.

As shown in FIG. 5, a sheet tension adjusting apparatus according to a third embodiment is composed of two sets of apparatus disposed axial-symmetrically, each being similar to the apparatus in the first or second embodiment. In FIG. 5, the right-hand half section has the same structure as that of the first or second embodiment shown in FIG. 1 or 4, and the same parts will be marked with the same numerals. On the other hand, the left-hand half section is located on the downstream side of the right-hand half section, and the components corresponding to those of the right-hand half section are also marked with the same numerals but expressed in a way of additionally giving "'" thereto.

That is, in the right-hand half section, as well as the first or second embodiment, there are provided a first powder brake guide roll 1, a first powder braking unit 4, a transmission belt 3 coupled to rotary shafts 2a, 2b, and guide rolls 5a, 5b, whereas provided in the left-hand section are a second powder brake guide roll 1', a second powder braking unit 4', a transmission belt 3' coupled to rotary shafts 2a', 2b', and guide rolls 5a', 5b'. The left-hand half section has the same structure as that of the right-hand half section although the mark "'" is given.

Furthermore, as in the case of the first embodiment, in the sheet tension adjusting apparatus according to the third embodiment, a single-faced corrugated fiberboard sheet $S_1$ manufactured by applying a paste onto the peak portions of corrugated core paper (sheet) $C_1$ and adhering a liner $L_1$ thereto is wound around the guide rolls 1, 1' and conveyed in a state where the crest-made core paper $C_1$ is positioned inside, thereby adjusting the tension to the single-faced corrugated fiberboard sheet $S_1$.

A surface processing such as a surface-treatment comprising mesh-processing and chrome-plating or thermal spraying is made on outer circumferential surfaces of the guide rolls 1, 1' to increase the coefficient of friction of the roll surfaces.

In addition, before and after the guide rolls 1, 1' (at positions before and after the points where the single-faced corrugated fiberboard sheet $S_1$ is wound around the guide rolls 1, 1'), guide rolls 5a, 5b; 5a' 5b' are respectively disposed to guide the single-faced corrugated fiberboard sheet $S_1$, and in a manner of adjusting the positions of these guide rolls 5a, 5b; 5a', 5b', the contact angles (winding angles) $\theta_3$, $\theta_3'$ of the single-faced corrugated fiberboard sheet $S_1$ to the guide rolls 1, 1' are adjustable and maintainable.

Moreover, in this embodiment, in addition to the first powder braking unit 4 for changing the braking force working on the guide roll 1, there is provided the second powder braking unit 4' for changing the braking force working on the guide roll 1'.

Since the first powder braking unit 4 side is constructed as well as the first embodiment, the description will be omitted for simplicity. On the second powder braking unit 4' side, as in the case of the first powder braking unit 4 side, the transmission belt 3' is wound around the rotary shaft 2a' of the guide roll 1' and the rotary shaft 2b' of the second powder braking unit 4' so that the torque change (braking force change) of the second powder brake guide roll 1' is conducted by the second powder braking unit 4' through the transmission belt 3', thus changing the tension to the single-faced corrugated fiberboard sheet $S_1$.

Besides, since the second powder braking unit 4' is constructed as well as the first powder braking unit 4 mentioned before with reference to FIGS. 2 and 3, the description thereof will be omitted.

Since the sheet tension adjusting apparatus according to the third embodiment of this invention is constructed as described above, the single-faced corrugated fiberboard sheet $S_1$ is first conveyed in a state of being wound around the first powder brake guide roll 1 at a given contact angle $\theta_3$ owing to the effects of the guide rolls 5a, 5b.

In this state, the first powder braking unit 4 makes a change in the torque of the first powder brake guide roll 1 (changes the braking force) through the rotary shaft 2b, the transmission belt 3 and the rotary shaft 2a to make a change in the tension to the single-faced corrugated fiberboard sheet $S_1$, thereby adjusting the degree of expansion and contraction of the single-faced corrugated fiberboard sheet $S_1$.

Figure 6:
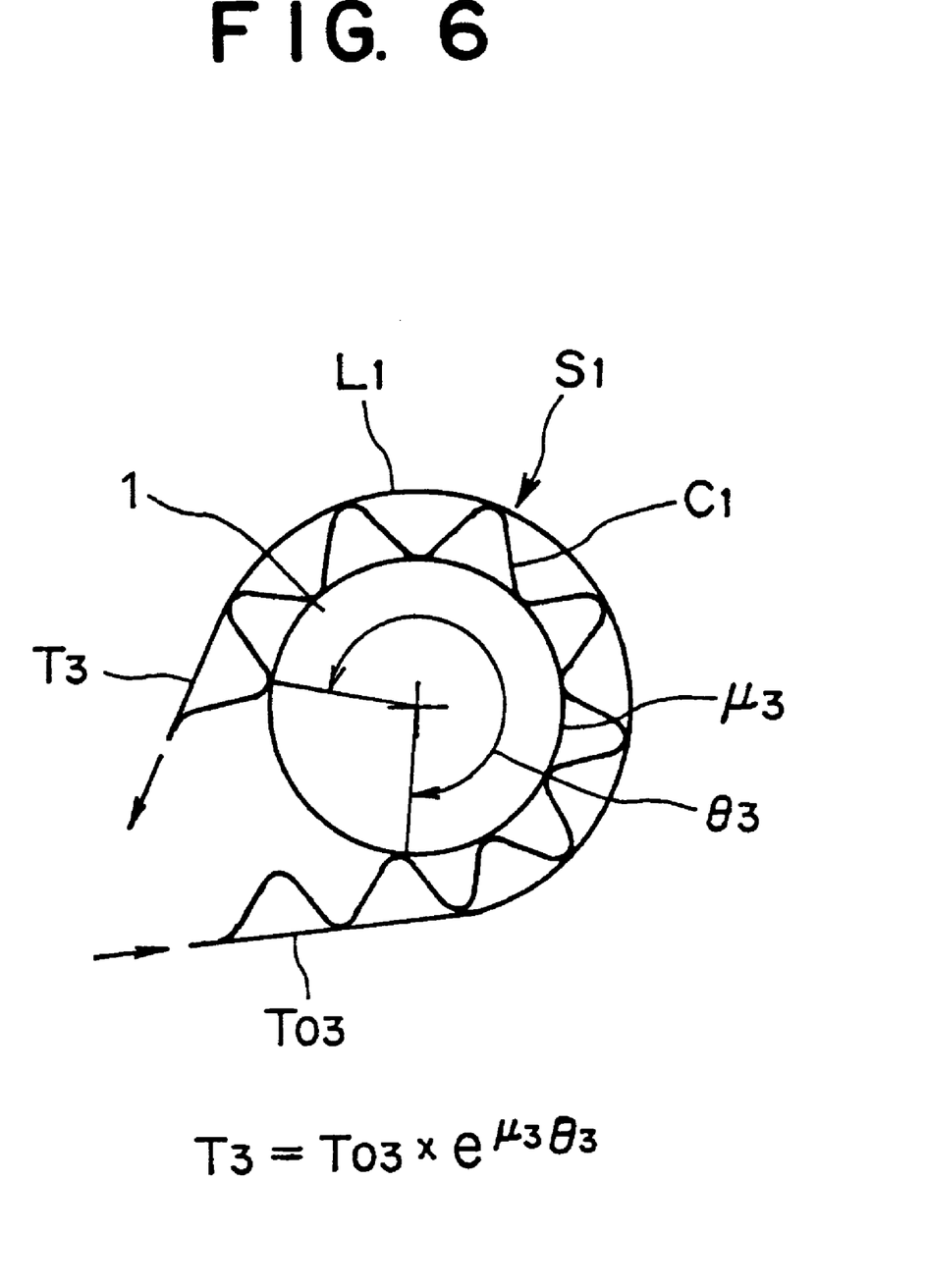
FIG. 6 is a side elevational view illustratively showing a roll (a principal section in FIG. 5) carrying a wound single-faced corrugated fiberboard sheet for describing the relationship between the exit side maximum tension and the entrance side tension on a roll in the third embodiment.

At this time, as shown in FIG. 6, the maximum roll exit side tension $T_3$ immediately before the single-faced corrugated fiberboard sheet $S_1$ slips on the guide roll 1 is generally expressed as the following equation (3).

$$T_3 = T_{03} \times \exp(\mu_3 \theta_3) \quad (3)$$

In this equation (3), $\exp(x) = e^x$ (e: the base of the natural logarithm), $T_{03}$ represents a tension to the single-faced corrugated fiberboard sheet $S_1$ on the entrance side of the guide roll 1, $\mu_3$ denotes a coefficient of friction of the surface of the guide roll 1, and $\theta_3$ depicts a contact angle of the single-faced corrugated fiberboard sheet $S_1$ with respect to the guide roll 1.

From the above-mentioned equation (3), the maximum roll exit side tension $T_3$ increases as any one of the roll 1 entrance side tension $T_{03}$, the coefficient of friction $\mu_3$ of the roll 1 surface and the contact angle $\theta_{03}$ to the guide roll 1 is made to increase. For instance, if $T_{03} = 0.2$ kgf/cm, $\mu_3 = 0.4$ and $\theta_3 = 180°$, the first powder brake guide roll 1 exit side maximum tension $T_3$ assumes 0.7 kgf/cm.

In the FIG. 5 apparatus according to the third embodiment, the second powder brake guide roll 1' rotates together until the exit side tension to the single-faced corrugated fiberboard sheet $S_1$ reaches the maximum tension on the exit side of the first powder brake guide roll 1. When the exit side tension to the single-faced corrugated fiberboard sheet $S_1$ exceeds the maximum tension on the exit side of the first powder brake guide roll 1, the torque of the first powder brake guide roll 1 is maintainable while the single-faced corrugated fiberboard sheet $S_1$ slips on the first powder brake guide roll 1.

Thus, the tension to the single-faced corrugated fiberboard sheet $S_1$ wound around the second powder brake guide roll 1' in a state where the core paper $C_1$ is placed inside is changed in a manner that the torque is given by the second powder braking unit 4' through the transmission belt 3' to only the second powder brake guide roll 1'.

Accordingly, the relationship between the maximum exit side tension $T_3'$ immediately before the single-faced corrugated fiberboard sheet $S_1$ slips on the second powder brake guide roll 1' and the entrance side tension $T_{03}$ by the first powder brake guide roll 1' is expressed as the following equation (4).

$$T_3' = T_{03} \times \exp(\mu_3 \theta_3) \times \exp(\mu_3' \theta_3') \quad (4)$$

In this equation (4), exp $(x)=e^x$ (e: the base of the natural logarithm), $T_{O3}$ represents a tension to the single-faced corrugated fiberboard sheet $S_1$ on the entrance side of the guide roll 1, $\mu_3$ denotes a coefficient of friction of the surface of the guide roll 1, $\theta_3$ depicts a contact angle of the single-faced corrugated fiberboard sheet $S_1$ with respect to the guide roll 1, $\mu_3'$ denotes a coefficient of friction of the surface of the guide roll 1', $\theta_3'$ depicts a contact angle of the single-faced corrugated fiberboard sheet $S_1$ with respect to the guide roll 1'.

From the above-mentioned equation (4), the second maximum roll exit side tension $T_3'$ increases as the coefficients of friction $\mu_3$, $\mu_3'$ and the contact angles $\theta_3$, $\theta_3'$ are made to increase.

For instance, if $T_{O3}=0.2$ kgf/cm, $\mu_3=0.4$, $\theta_3=180°$, $\mu_3'=0.45$ and $\theta_3'=225°$, the second powder brake guide roll 1' exit side maximum tension $T_3'$ assumes 4.1 kgf/cm. Accordingly, even if the first powder brake guide roll 1 entrance side tension $T_{O3}$ takes 0.2 kgf/cm, the second powder brake guide roll 1' exit side maximum tension $T_3'$ assumes 4.1 kgf/cm, so that the tension adjustment is possible throughout a wide range of 0.2 to 4.1 kgf/cm.

As mentioned above, comparing the case that only the guide roll 1 is put into operation and the guide roll 1' rotates together with the case that both the guide rolls 1, 1' are put into operation, the way of operating both the guide rolls 1, 1' can raise the maximum tension working on the single-faced corrugated fiberboard sheet $S_1$ up to approximately 6 times.

In the case that the change of the tension to the single-faced corrugated fiberboard sheet $S_1$ is made by changing the torque of the second guide roll 1' in a manner that the single-faced corrugated fiberboard sheet $S_1$ slips on the first guide roll 1, the maximum tension comes to approximately 3 to 4 kgf/cm. When offering this maximum tension of approximately 3 to 4 kgf/cm, the rate of change of the single-faced corrugated fiberboard sheet $S_1$ in expansion and contraction results in being approximately 0.3 to 0.4%.

As described above, according to the third embodiment of this invention, the increase in the roll exit side maximum tension $T_3'$ to the single-faced corrugated fiberboard sheet $S_1$ is easily achievable and the tension to the single-faced corrugated fiberboard sheet $S_1$ is adjustable over a wider range with a higher accuracy as compared with the first embodiment, and therefore, it is possible to adjust the upward or downward warp of the single-faced corrugated fiberboard sheet $S_1$ so that the quality of a corrugated fiberboard sheet to be manufactured is improvable.

Incidentally, it is also appropriate to conduct the tension adjustment through the application of the torque of the guide rolls 1, 1' in a manner that the single-faced corrugated fiberboard sheet $S_1$ is wound around the guide rolls 1, 1' in a state where the liner $L_1$ is positioned inside, the single-faced corrugated fiberboard sheet $S_1$ is wound around one guide roll 1 or 1' in a state where the core paper $C_1$ is positioned inside while the single-faced corrugated fiberboard sheet $S_1$ is wound around the other guide roll 1' or 1 in a state where the liner $L_1$ is positioned inside.

[D] Description of Fourth Embodiment

Figure 7:
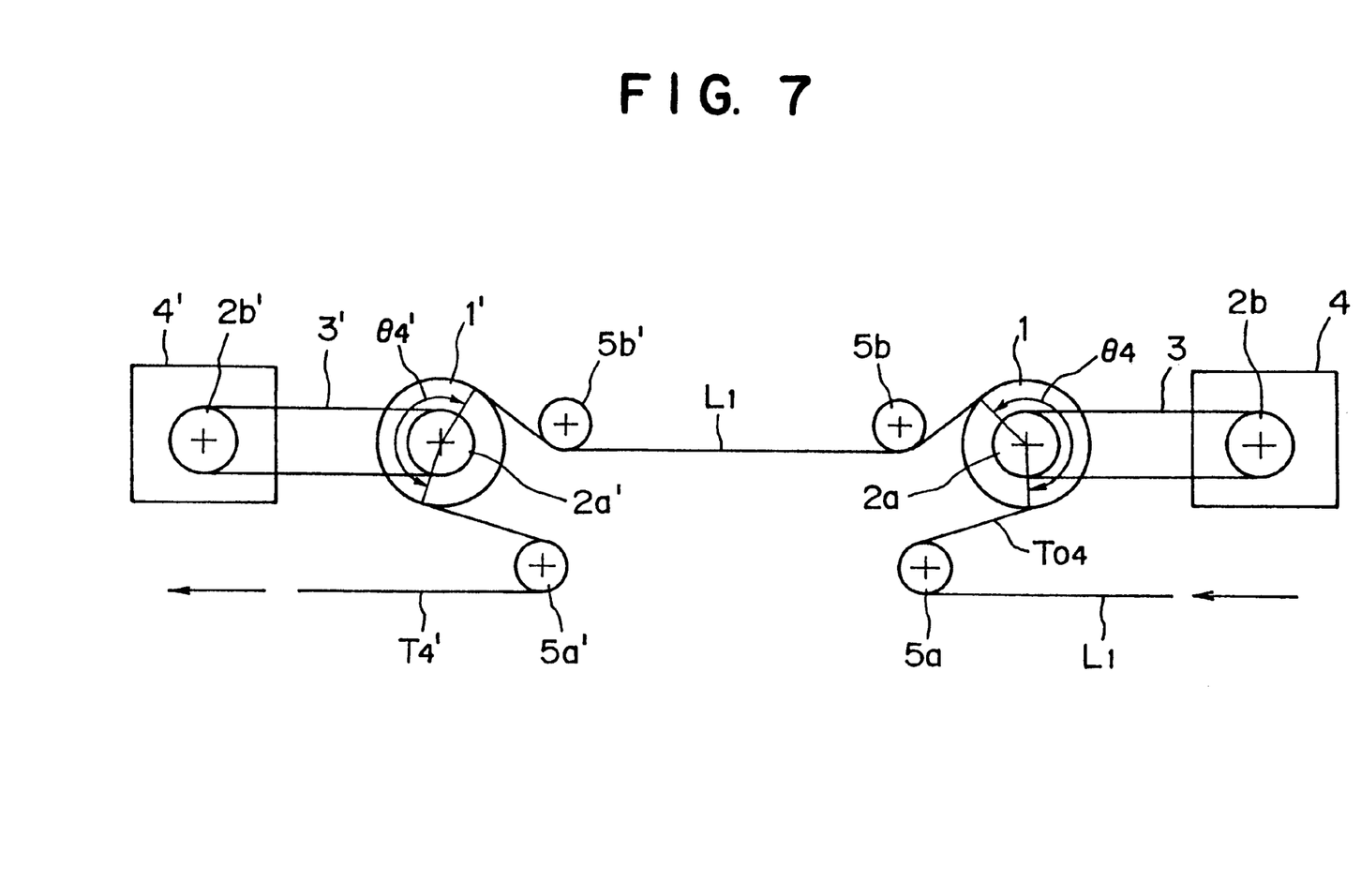
FIG. 7 is a side elevational view illustratively showing an apparatus (sheet tension adjusting apparatus) based upon a sheet tension adjusting method according to a fourth embodiment of the present invention.

As shown in FIG. 7, in a sheet tension adjusting apparatus according to a fourth embodiment, instead of the single-faced corrugated fiberboard sheet $S_1$ in the third embodiment, a liner $L_1$ before adhering core paper $C_1$ is wound around a first powder brake guide roll 1 and a second powder brake guide roll 1' and conveyed to adjust the tension to this liner $L_1$. In the illustration, the same numerals as those mentioned above designate the same or substantially same components, and the description thereof will be omitted.

As shown in FIG. 7, in the apparatus according to the fourth embodiment, as well as the third embodiment, the change of the torque of the first powder brake guide roll 1 is made by a first powder braking unit 4 through a transmission belt 3, and the change of the torque of the second powder brake guide roll 1' is made by a second powder braking unit 4' through a transmission belt 3', thereby changing the tension to the liner $L_1$.

More specifically, in the fourth embodiment, the liner $L_1$ is first conveyed in a state of being wound around the first powder brake guide roll 1 at a given contact angle $\theta_4$ owing to the effects of the guide rolls 5a, 5b.

In this state, the first powder braking unit 4 makes a change in the torque of the first powder brake guide roll 1 (changes the braking force) through a rotary shaft 2b, the transmission belt 3 and a rotary shaft 2a to make a change in the tension to the liner $L_1$, thereby adjusting the degree of expansion and contraction of the liner $L_1$.

Similarly, in the FIG. 7 apparatus according to the fourth embodiment, the second powder brake guide roll 1' rotates together until the exit side tension to the liner $L_1$ reaches the maximum tension on the exit side of the first powder brake guide roll 1. When the exit side tension to the liner $L_1$ exceeds the maximum tension on the exit side of the first powder brake guide roll 1, the torque of the first powder brake guide roll 1 is maintainable while the liner $L_1$ slips on the first powder brake guide roll 1.

Thus, the tension to the liner $L_1$ wound around the second powder brake guide roll 1' is changed in a manner that the torque is given by the second powder braking unit 4' through the transmission belt 3' to only the second powder brake guide roll 1'.

Accordingly, the relationship between the maximum exit side tension $T_4'$ immediately before the liner $L_1$ slips on the second powder brake guide roll 1' and the entrance side tension $T_{O4}$ by the first powder brake guide roll 1' is expressed as the following equation (5).

$$T_4'=T_{O4}\times\exp(\mu_4\theta_4)\times\exp(\mu_4'\theta_4') \tag{5}$$

In this equation (5), exp $(x)=e^x$ (e: the base of the natural logarithm), $T_{O4}$ represents a tension to the liner $L_1$ on the entrance side of the guide roll 1, $\mu_4$ denotes a coefficient of friction of the surface of the guide roll 1, $\theta_4$ depicts a contact angle of the liner $L_1$ with respect to the guide roll 1, $\mu_4'$ denotes a coefficient of friction of the surface of the guide roll 1', $\theta_4'$ depicts a contact angle of the liner $L_1$ with respect to the guide roll 1'.

From the above-mentioned equation (5), the second maximum roll exit side tension $T_4'$ increases as the coefficients of friction $\mu_4$, $\mu_4'$ and the contact angles $\theta_4$, $\theta_4'$ are made to increase.

Also in the fourth embodiment, for instance, if $T_{O4}=0.2$ kgf/cm, $\mu_4=0.4$, $\theta_4=180°$, $\mu_4'=0.45$ and $\theta_4'=225°$, the second powder brake guide roll 1' exit side maximum tension $T_4'$ assumes 4.1 kgf/cm. Accordingly, even if the first powder brake guide roll 1 entrance side tension $T_{O4}$ takes 0.2 kgf/cm, the second powder brake guide roll 1' exit side maximum tension $T_4'$ assumes 4.1 kgf/cm, so that the tension adjustment is possible throughout a wide range of 0.2 to 4.1 kgf/cm.

As described above, according to the fourth embodiment of this invention, the increase in the roll exit side maximum tension $T_4'$ to the liner $L_1$ i is easily achievable and the tension to the liner $L_1$ is adjustable over a wider range with a higher accuracy as compared with the second embodiment, and therefore, it is possible to adjust the upward or downward warp of the liner $L_1$ so that the quality of a corrugated fiberboard sheet to be manufactured is improvable.

[E] Others

Although in the above-described third and fourth embodiments the tension adjustment by the application of the torque of the first powder brake guide roll 1 and the tension adjustment by the application of the torque of the second powder brake guide roll 1' are done separately as two steps, it is also possible that the applications of the torques of the guide rolls 1, 1' are done simultaneously to perform the tension adjustment.

Furthermore, an electromagnetic brake other than the powder brake can also be employed as the braking units 4, 4' used in the first to fourth embodiments, and three or more guide rolls can also be provided to giving a torque to the single-faced corrugated fiberboard sheet $S_1$ or the liner $L_1$.

Besides, it should be understood that this invention is not limited to the above-described embodiments, and that it is intended to cover all changes and modifications of the embodiments, which do not constitute departures from the spirit and scope of the invention.

What is claimed is:

1. A method of adjusting a tension to a single-faced corrugated fiberboard sheet manufactured by adhering a liner onto a corrugated sheet, comprising the steps of:
    (a) winding said single-faced corrugated fiberboard sheet around at least one first roll;
    (b) guiding said single-faced corrugated fiberboard sheet by one or more second rolls at positions directly upstream and downstream of said first roll during said winding in said step (a) so as to define a contact angle of said single-faced corrugated fiberboard sheet with respect to said roll; and
    (c) changing a braking force to said first roll during said winding in said step (a) according to said contact angle defined in said step (b) so as to adjust a tension to said single-faced corrugated fiberboard sheet.

2. A sheet tension adjusting method as defined in claim 1, wherein an outer circumferential surface of said first roll is processed to increase its coefficient of friction.

3. A method of adjusting a tension to a liner which is to be adhered onto a corrugated sheet in manufacturing a single-faced corrugated fiberboard sheet, said method comprising the steps of:
    (a) winding said liner around at least one roll;
    (b) guiding said liner by one or more second rolls at positions directly upstream and downstream of said first roll during said winding in said step (a) so as to define a contact angle of said liner with respect to said first roll; and
    (c) changing a braking force to said first roll during said winding of said step (a) according to said contact angle defined in said step (b) so as to adjust a tension to said liner.

4. A sheet tension adjusting method as defined in claim 3, wherein an outer circumferential surface of said first roll is processed to increase its coefficient of friction.

5. An apparatus for adjusting a tension to a single-faced corrugated fiberboard sheet manufactured by adhering a liner onto a corrugated sheet, said apparatus comprising:
    at least one first roll around which said single-faced corrugated fiberboard sheet is to be wound;
    one or more second rolls, disposed at positions directly upstream and downstream of said first roll, for defining a contact angle of said single-faced corrugated fiberboard sheet with respect to said first roll; and
    a braking unit for braking said first roll, said braking unit including a mechanism for changing a braking force to said first roll according to said contact angle defined by said second rolls so as to adjust a tension to said single-faced corrugated fiber board sheet.

6. A sheet tension adjusting apparatus as defined in claim 5, wherein an outer circumferential surface of said first roll is processed to increase its coefficient of friction.

7. An apparatus for adjusting a tension to a liner which is to be adhered onto a corrugated sheet in manufacturing a single-faced corrugated fiberboard sheet, said apparatus comprising:
    at least one first roll around which said liner is to be wound;
    one or more second rolls disposed at positions directly upstream and downstream of said first roll, for defining a contact angle of said liner with respect to said first roll; and
    a braking unit for braking said first roll, said braking unit including a mechanism for changing a braking force to said first roll according to the contact angle defined by said second rolls so as to adjust a tension to the liner.

8. A sheet tension adjusting apparatus as defined in claim 7, wherein an outer circumferential surface of said first roll is processed to increase its coefficient of friction.

* * * * *